Jan. 30, 1968   D. W. KELBEL   3,366,208
SYNCHRONIZER
Filed May 3, 1965

Inventor
Donald W. Kelbel
By
Robert L. Zieg
Atty.

United States Patent Office 3,366,208
Patented Jan. 30, 1968

3,366,208
SYNCHRONIZER
Donald W. Kelbel, Muncie, Ind., assignor to Borg-Warner Corporation, Chicago, Ill., a corporation of Illinois
Filed May 3, 1965, Ser. No. 452,654
12 Claims. (Cl. 192—53)

ABSTRACT OF THE DISCLOSURE

A synchronizer structure of the thrust bar type including an axially movable clutch sleeve having a synchronizer ring drivingly connected thereto. The synchronizer ring has a clutch surface engageable with a clutch drum having two non-parallel clutch surfaces thereon. The clutch drum being drivingly connected to a gear to be synchronized and the clutch ring having two parallel clutch surfaces thereon. One surface on the clutch ring being engageable with one of the surfaces on said clutch drum and the other surface being engageable with said gear. The clutch ring is also drivingly connected to the synchronizer ring. The multiple clutch surface synchronizer structure providing three times the normal torque capacity of a synchronizer by inclusion of three pairs of mating clutch surfaces.

---

This invention relates to a transmission synchronizer wherein a pair of relatively rotating transmission components are brought into synchronization and are then drivingly connected together for transmission of torque.

One object of this invention is to provide an improved synchronizer structure of the type using blocking rings wherein thrust bars are used to apply thrust to the blocking rings when a clutch sleeve is moved axially, the blocking rings acting to establish a frictional driving connection between the parts to be brought into synchronization and a clutch sleeve is provided to establish a positive driving connection between the two relatively rotating components after the components are brought into synchronization by means of the frictional driving connection.

It is another object of the invention to provide an improved synchronizer of the type shown above which utilizes a multiple friction surface conical clutch structure that affords a greatly increased frictional area as compared to known conical clutch type synchronizers without any increase in the diameter of the cone clutch or the related transmission components.

It is a further object of the present invention to provide an improved synchronizer having a greatly increased torque capacity due to the use of an improved form of conical clutch construction.

It is a further object to provide an improved synchronizer clutch having a greatly increased torque capacity without increasing the radial size of related transmission components.

Figure 1:
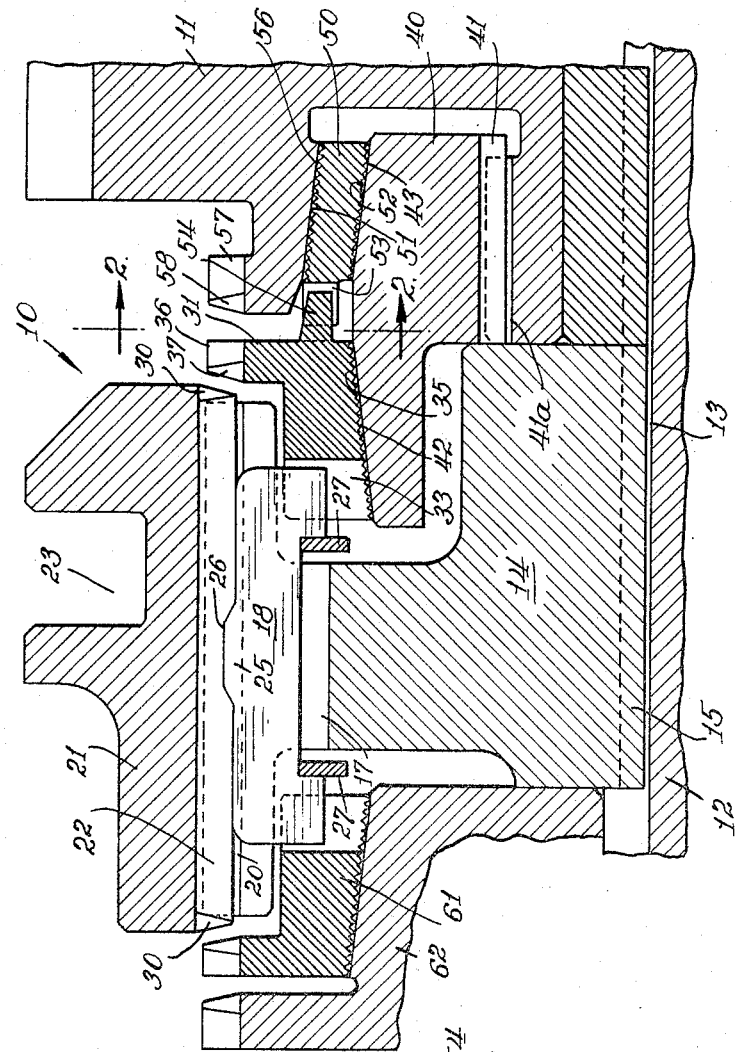
Figure 2:
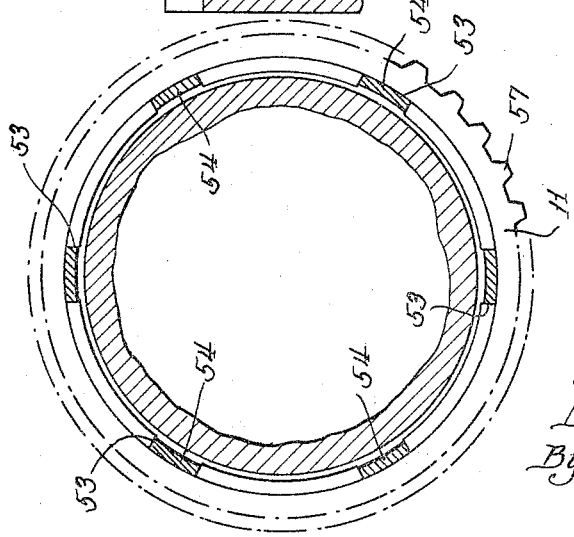

The invention consists of the novel constructions, arrangements and devices to be hereinafter described and claimed for carrying out the above stated objects and such other objects as will be apparent from the following description of the preferred form of the invention illustrated with reference to the accompanying drawings wherein:

FIGURE 1 is an axial sectional view through a transmission synchronizer embodying the invention; and FIGURE 2 is a view partially in cross section taken as indicated by the line 2—2 of FIGURE 1.

In the known type of transmission synchronizer wherein a cone clutch is provided to establish the frictional driving connection for bringing relatively rotating members into synchronization such as that illustrated in the patent to White et al. No. 2,221,900 issued November 19, 1940 the blocking rings such as member 29 in FIGURE 1 of the mentioned patent are provided with one clutch surface which engages with the conical clutch surface provided on the gear 19 as indicated by numeral 32. With this type of synchronizer structure it is difficult to adapt the synchronizer for transmission of increased torque. The known methods for providing the increased torque capacity consist mainly of increasing the diameter of the friction clutch parts of the synchronizer to provide a torque arm of increased radius for the friction clutch with reference to the axis of the gears to be brought into synchronization.

It will be apparent that limitations exist in attempting to increase the diameter of the synchronizer parts since it would require a larger transmission case and take more space within a vehicle. With applicant's improved synchronizer structure increased torque capacity is obtained by means of approximately tripling the effective frictional clutch area as opposed to increasing the radius of the parts. The clutch area is tripled or greatly increased by the use of a clutch drum having two male conical non-parallel clutch surfaces thereon, one of the surfaces to be engaged by a clutch surface on the blocking ring member of the synchronizer and including a clutch ring drivingly connected to the blocking ring which has a pair of parallel conical clutch surfaces thereon the internal one of which is frictionally engageable with the other clutch surface on the drum and the other of which is engageable with a clutch surface provided on a gear. Thus three pairs of frictional clutch engaging surfaces are provided to synchronize two components of a transmission.

Referring to FIGURE 1 the synchronizing assembly 10 is illustrated as used in a transmission including a rotary part or gear 11 and a shaft 12. The shaft 12 is provided with splines 13. A hub or torque transmitting member 14 is provided including splines 15. Splines 15 of the hub 14 engage splines 13 on shaft 12 and drivingly connect the hub and shaft.

The hub has three slots 17 provided therein. Received within the slots 17 are thrust bars 18. External splines 20 are provided on the hub 14. A clutch sleeve 21 is provided which encircles hub 14 and has internal splines 22 which engage with the splines 20 in the hub 14 to provide a driving connection. The clutch sleeve 21 has a circumferential groove 23 provided therein to receive a shifting fork (not illustrated).

The thrust bars 18 have a raised portion 25 which is engaged within a circumferential inner groove 26 cut in the clutch sleeve; circular wire springs 27 are provided which urge the thrust bars 18 radially outwardly into engagement with the clutch sleeve 21. The internal splines 22 of the clutch sleeve are provided with a chamfer at each end as indicated at 30.

A blocking ring or synchronizing ring 31 is provided which has slots 33 formed therein to receive the ends of the thrust bars 18 which provide the driving connection between the hub 14 and the blocking ring 31. The blocking ring 31 is provided with an inner or female conical clutch surface 35. The blocking ring 31 has external clutch teeth 36 which are chamfered as indicated at 37.

A clutch drum 40 is provided which has internal splines 41. The gear 11 has external splines 41a thereon which mate with splines 41 to drivingly connect drum 40 and gear 11. The clutch drum 40 has a pair of non-parallel friction male conical clutch surfaces 42 and 43 thereon which intersect at an obtuse angle. The male or external clutch surfaces 42 and 43 are of substantially the same diameter or radial extent.

Disposed between the gear 11 and the clutch drum 40 and adjacent the blocking ring 31 is a clutch ring 50. The clutch ring 50 has a pair of parallel conical clutch surfaces 51 and 52 provided thereon. The surface 51 is a male or external conical clutch surface and the surface 52 is a female or internal conical clutch surface. A series of notches 53 are provided equally spaced around the edge of the clutch ring 50 adjacent blocking ring 31. A matching series of projections or lugs 54 are provided on blocking ring 31 which engage in the notches 53 of the clutch ring 50 to provide a positive driving engagement between blocking ring 31 and clutch ring 50 but at the same time allowing relative axial movement between the blocking ring and the clutch ring.

The gear 11 is provided with an internal or female conical clutch surface 56 which is adapted to be engaged by the conical clutch surface 51 on the clutch ring 50. External teeth 57 are provided on the gear 11 which are adapted to be engaged by the internal splines 22 of the clutch sleeve when the gear 11 is to be drivingly connected to the shaft 12. External teeth 57 are chamfered as indicated at 58.

The operation of the synchronizer of the present invention is as follows. When the clutch sleeve 21 is moved to the right to engage the gear 11 the thrust bars 18 will move therewith to bear against and urge the blocking ring 31 to the right which will first have the effect of engaging the clutch surface 35 on the blocking ring 31 with the clutch surface 42 on the clutch drum 40. When this engagement takes place there will be a slight axial movement of the clutch drum 40 which will be effective to engage the clutch surface 43 on clutch drum 40 with clutch surface 52 on clutch ring 50 and also engage the clutch surface 51 on clutch ring 50 with clutch surface 56 on gear 11.

This initial engagement will cause the blocking ring 31 and the clutch ring 50 to turn with the gear 11 and thus cause a relative rotation between the blocking ring 31 and the hub or torque transmitting member 14 in the direction of the movement of the part which is rotating at a greater speed, thus causing the chamfered surfaces of the teeth 36 of the blocking ring 31 and the splines 22 on the clutch sleeve 21 to move into blocking register. Once the blocking ring moves into blocking register continued movement of the clutch sleeve 21 will be resisted by the chamfered surfaces of the teeth 36, even though considerable force is applied to the clutch sleeve 21 tending to cause it to move into its desired positive engagement with the teeth 57 on gear 11. Therefore, a resistance to positive clutch engagement will exist until the gear 11 arrives at a synchronous speed with the clutch sleeve 21 at which point there will be a relative reversal of movement causing the blocking ring 31 to move to a position where the teeth 36 on the blocking ring are in register with the internal splines 22 on the clutch sleeve 21. When such a position is assumed there will be no further resistance to movement of the clutch sleeve 21 and it may therefore be urged onwardly into positive clutch engagement with the teeth 57 on the gear 11, the yielding connection between the thrust bars 18 and the clutch sleeve 21 breaking away under the force applied to move the clutch sleeve 21. A positive clutching action is now provided between the clutch sleeve and gear 11 and the gear 11 is in positive driving engagement with the shaft 12.

The synchronizing structure on the opposite side of the hub 14 from gear 11 has not been illustrated but it may be of the conventional type as shown in the above mentioned White et al. patent or it may be of the improved type as described in the above description depending upon the type of transmission in which the synchronizer is to be used.

From the foregoing description it will be apparent that the friction clutching action of the synchronizer takes place by the engagement of three pairs of conical clutch surfaces. Thus there has been provided an improved friction clutch arrangement for synchronizing the hub 14 with the gear 11 in which a cone clutch structure is utilized which provides a greatly increased area of clutch surface as compared to known synchronizers of the cone clutch type. Further due to the construction of clutch drum having non-parallel clutching surfaces intersecting at an obtuse angle, axial movement of the blocking ring is effective to engage all of the clutching surfaces.

The use of a clutch drum having non-parallel conical clutch surfaces of substantially the same diameter provides there engaging pairs of friction surfaces while not requiring an axial stacking arrangement as provided in known types of multiple friction-surface synchronizers. By thus not requiring an axial stacking of cone clutch parts the necessary increase in radius of parts is avoided by the improved structure described above.

Further it will be apparent that the greatly increased frictional area which is provided by the novel and improved structure described above provides a synchronizing structure which is capable of synchronizing a gear with another part of a transmission under greatly increased torque loads since the torque carrying capacity of the friction clutch structure of the synchronizer has been greatly increased. The novel structure is of a nature that although tripling the friction clutch area of the cone friction clutch of the synchronizer none of the related parts of the synchronizer are of any larger diameter than those previously used in the same transmission. Thus the applicant's novel and improved structure provides an economical and efficient way of increasing the torque capacity of a synchronizer since increased radius of synchronizing parts is not called for.

While the invention is susceptible of various modifications and alternative constructions, a preferred embodiment is diagrammatically shown in the drawings and is herein described in detail. It is to be understood, however, that it is not thereby intended to limit the invention to the specific form disclosed. On the contrary it is intended to cover all modifications and alternative constructions falling within the spirit and scope of the invention as expressed in the appended claims.

What is claimed is:

1. In a synchronizer mechanism a torque transmitting hub, a synchronizer ring drivingly associated therewith and shiftable axially for establishing a frictional driving connection between said hub and a gear to be synchronized therewith, a clutch sleeve encircling said hub and drivingly connected thereto and shiftable axially for establishing a positive driving connection between said hub and said gear, means establishing a thrust transmitting relation between said sleeve and said ring, a clutch drum drivingly connected to and axially slidable with respect to said gear and having a pair of clutch surfaces thereon, one of said clutch surfaces on said drum being frictionally engageable by said ring, an annular ring drivingly connected to said synchronizer ring, said annular ring having clutch surfaces thereon engageable with said gear and the other clutch surface on said drum to establish a frictional driving connection between said gear and said drum, whereby when said clutch sleeve is axially shifted said clutch drum will be frictionally engaged by said ring and said gear to synchronize said gear and said hub prior to establishment of said positive driving connection.

2. In a synchronizer mechanism a torque transmitting hub, a synchronizer ring drivingly associated therewith and shiftable axially for establishing a frictional driving connection between said hub and a gear to be synchronized therewith, a clutch sleeve encircling said hub and drivingly connected thereto and shiftable axially for establishing a positive driving connection between said hub and said gear, means establishing a thrust transmitting relation between said sleeve and said ring, a clutch drum drivingly connected to and axially slidable with respect to said gear and having a pair of external clutch surfaces thereon, one of said clutch surfaces on said drum being frictionally engageable by said ring, an annular ring drivingly connected to said synchronizer ring, said annular ring having clutch surfaces thereon engageable with said gear and the other clutch surface on said drum to establish a frictional driving connection between said gear and said drum, whereby when said clutch sleeve is axially shifted said clutch drum will be frictionally engaged by said ring and said gear to synchronize said gear and said hub prior to establishment of said positive driving connection.

3. In a synchronizer mechanism a torque transmitting hub, a synchronizer ring drivingly associated therewith and shiftable axially for establishing a frictional driving connection between said hub and a gear to be synchronized therewith, a clutch sleeve encircling said hub and drivingly connected thereto and shiftable axially for establishing a positive driving connection between said hub and said gear, means establishing a thrust transmitting relation between said sleeve and said ring, a clutch drum drivingly connected to and axially slidable with respect to said gear and having a pair of male conical clutch surfaces thereon, one of said clutch surfaces on said drum being frictionally engageable by said ring, an annular ring drivingly connected to said synchronizer ring, said annular ring having clutch surfaces thereon engageable with said gear and the other clutch surface on said drum to establish a frictional driving connection between said gear and said drum, whereby when said clutch sleeve is axially shifted said clutch drum will be frictionally engaged by said ring and said gear to synchronize said gear and said hub prior to establishment of said positive driving connection.

4. In a synchronizer mechanism a torque transmitting hub, a synchronizer ring drivingly associated therewith and shiftable axially for establishing a frictional driving connection between said hub and a gear to be synchronized therewith, a clutch sleeve encircling said hub and drivingly connected thereto and shiftable axially for establishing a positive driving connection between said hub and said gear, means establishing a thrust transmitting relation between said sleeve and said ring, a clutch drum drivingly connected to and axially slidable with respect to said gear and having a pair of non-parallel clutch surfaces thereon, one of said clutch surfaces being frictionally engageable by said ring, an annular ring drivingly connected to said synchronizer ring, clutch surfaces on said annular ring engageable with said gear and the other clutch surface on said drum whereby when said clutch sleeve is axially shifted said clutch drum will be frictionally engaged by said ring and said gear to synchronize said gear and said hub prior to establishment of said positive driving connection.

5. In a synchronizer mechanism a torque transmitting hub, a synchronizer ring drivingly associated therewith and shiftable axially for establishing a frictional driving connection between said hub and a gear to be synchronized therewith, a clutch sleeve encircling said hub and drivingly connected thereto and shiftable axially for establishing a positive driving connection between said hub and said gear, means establishing a thrust transmitting relation between said sleeve and said ring, a clutch drum drivingly connected and axially slidable with respect to said gear and having a pair of non-parallel clutch surfaces thereon, a clutch surface on said gear, a clutch ring drivingly connected to said synchronizer ring having a clutch surface engageable with the surface on said gear and a clutch surface engageable with one of the surfaces on said drum, the other clutch surface on said drum being frictionally engageable by said synchronizing ring whereby when said clutch sleeve is axially shifted said clutch drum will be frictionally engaged by said synchronizer ring and said clutch ring to synchronize said gear and said hub prior to establishment of said positive driving connection.

6. In a synchronizer mechanism a torque transmitting hub, a synchronizer ring drivingly associated therewith and shiftable axially for establishing a frictional driving connection between said hub and a gear to be synchronized therewith, a clutch sleeve encircling said hub and drivingly connected thereto and shiftable axially for establishing a positive driving connection between said hub and said gear, means establishing a thrust transmitting relation between said sleeve and said ring, a clutch drum drivingly connected to and axially slidable with respect to said gear and having a pair of non-parallel clutch surfaces thereon, a clutch surface on said gear, a clutch ring drivingly connected to said synchronizer ring having a pair of parallel clutch surfaces thereon, one of said parallel clutch surfaces being engageable with the surface on said gear and the other of said parallel clutch surfaces being engageable with one of the surfaces on said drum, the other clutch surface on said drum being frictionally engageable by said synchronizing ring whereby when said clutch sleeve is axially shifted said clutch drum will be frictionally engaged by said synchronizing ring and clutch ring to synchronize said gear and said hub prior to establishment of said positive driving connection.

7. In a synchronizer mechanism a torque transmitting hub, a synchronizer ring drivingly associated therewith and shiftable axially for establishing a frictional driving connection between said hub and a gear to be synchronized therewith, a clutch sleeve encircling said hub and drivingly connected thereto and shiftable axially for establishing a positive driving connection between said hub and said gear, means establishing a thrust transmitting relation between said sleeve and said synchronizer ring, means providing three pairs of engageable clutch surfaces to synchronize said gear with said hub, said last mentioned means comprising a clutch surface on said synchronizing ring, a clutch drum having a pair of non-parallel clutch surfaces thereon, said clutch drum being drivingly connected and axially slidable with respect to said gear, a clutch ring between said gear and said drum drivingly connected to said synchronizer ring and including a pair of clutch surfaces, said gear having a clutch surface thereon engageable with one of the clutch surfaces on said ring, said synchronizing ring being adapted when axially shifted by said clutch sleeve to engage the frictional surface on said synchronizer ring with one of said clutch surfaces on said drum and thereby to cause engagement of the other clutch surface on said drum with one of the clutch surfaces on said ring and engagement of the other clutch surface on said ring with said clutch surface on said gear to provide three pairs of engaged clutch surfaces when said clutch sleeve is axially shifted so that said hub and said gear are frictionally connected to cause synchronization thereof prior to establishment of said positive driving connection.

8. In a synchronizer mechanism a torque transmitting hub, a synchronizer ring drivingly associated therewith and shiftable axially for establishing a frictional driving connection between said hub and a gear to be synchronized therewith, a clutch sleeve encircling said hub and drivingly connected thereto and shiftable axially for establishing a positive driving connection between said hub and said gear, means establishing a thrust transmitting relation between said sleeve and said synchronizer ring, means providing three pairs of engageable clutch surfaces to synchronize said gear with said hub, said last mentioned means comprising a clutch surface on said synchronizing ring, a clutch drum having a pair of male conical clutch surfaces thereon, said clutch drum being drivingly connected and axially slideable with respect to said gear, a clutch ring between said gear and said drum drivingly connected to said synchronizer ring and including a pair of clutch surfaces, said gear having a clutch surface thereon engageable with one of the clutch surfaces on said ring, said synchronizing ring being adapted when axially shifted by said clutch sleeve to engage the frictional surface on said synchronizer ring with one of said clutch surfaces on said drum and thereby to cause engagement of the other clutch surface on said drum with one of the clutch surfaces on said ring and engagement of the other clutch surface on said ring with said clutch surface on said gear to provide three pairs of engaged clutch surfaces when said clutch sleeve is axially shifted so that said hub and said gear are frictionally connected to cause synchronization thereof prior to establishment of said positive driving connection.

9. In a clutch mechanism, a hub, an axially shiftable ring drivingly connected to said hub having an internal clutching surface therein, a clutch drum having a pair of clutch surfaces of substantially the same diameter thereon, one of said drum clutch surfaces being engageable with said clutch surface on said ring, a second ring drivingly connected to said axially shiftable ring and having a pair of clutch surfaces thereon, a rotary part adjacent said hub having a clutch surface therein engageable with one of said pair of clutch surfaces on said second ring, said clutch drum being drivingly connected to said rotary part, the other of said clutch surfaces on said second ring being engageable with the other clutch surface on said clutch drum, whereby when said axially shiftable ring is shifted a frictional driving engagement will be established between said hub and said rotary part by the engagement of said clutch drum with said shiftable ring and said second ring, and engagement of said second ring with said rotary part.

10. In a clutch mechanism, a hub, an axially shiftable ring drivingly connected to said hub having an internal clutching surface therein, a clutch drum having a pair of clutch surfaces of substantially the same diameter thereon, one of said drum clutch surfaces being engageable with said clutch surface on said axially shiftable ring, a second ring having a pair of clutch surfaces thereon, said shiftable ring and second ring being drivingly connected, a rotary part adjacent said hub having a clutch surface therein engageable with one of said pairs of clutch surfaces on said second ring, said clutch drum being drivingly connected to said rotary part, the other of said clutch surfaces on said second ring being engageable with the other clutch surface on said clutch drum whereby when said shiftable ring is shifted a frictional driving engagement will be established between said hub and said rotary part by means of the engagement of said clutch drum with said shiftable and second rings and engagement of said second ring with said rotary part.

11. In a clutch mechanism, a hub, an axially shiftable annular ring drivingly connected to said hub having a cone clutch surface therein, a clutch drum having a pair of non-parallel clutch surfaces thereon, one of said drum clutch surfaces being engageable with said clutch surface in said axially shiftable ring, a second annular ring having a pair of clutch surfaces thereon, said axially shiftable ring and said second ring being drivingly connected, a rotary part adjacent said hub having a clutch surface therein engageable with one of said pair of clutch surfaces on said second ring, said clutch drum being drivingly connected to said rotary part, the other of said clutch surfaces on said second ring being engageable with the other clutch surface on said clutch drum whereby when said axially shiftable ring is shifted a frictional driving engagement will be established between said hub and said rotary part by the engagement of said clutch drum with said axially shiftable and second rings and engagement of said second ring with said rotary part.

12. In a clutch mechanism, a hub, an axially shiftable annular ring drivingly connected to said hub having a cone clutch surface therein, a clutch drum having a pair of male conical clutch surfaces thereon, one of said drum clutch surfaces being engageable with said clutch surface in said axially shiftable ring, a second annular ring having a pair of clutch surfaces thereon, said axially shiftable ring and second ring being drivingly connected, a rotary part adjacent said hub and having a clutch surface therein engageable with one of said pair of clutch surfaces on said second ring, and clutch drum being drivingly connected to said rotary part, the other of said clutch surfaces on said second ring being engageable with the other clutch surface on said clutch drum whereby when said axially shiftable ring is shifted a frictional driving engagement will be established between said hub and said rotary part by the engagement of said clutch drum with said axially shiftable and second rings and engagement of said second ring with said rotary part.

References Cited

UNITED STATES PATENTS

| 2,788,874 | 4/1957 | Forster | 192—53.6 |
| 3,035,674 | 5/1962 | Peras | 192—53.6 |
| 3,270,843 | 9/1966 | Ivanchich | 192—53.6 |

FOREIGN PATENTS 1,385,860 12/1964 France.

FRED C. MATTERN, JR., *Primary Examiner.*

DAVID J. WILLIAMOWSKY, *Examiner.*

C. J. HUSAR, *Assistant Examiner*